Patented Dec. 1, 1931

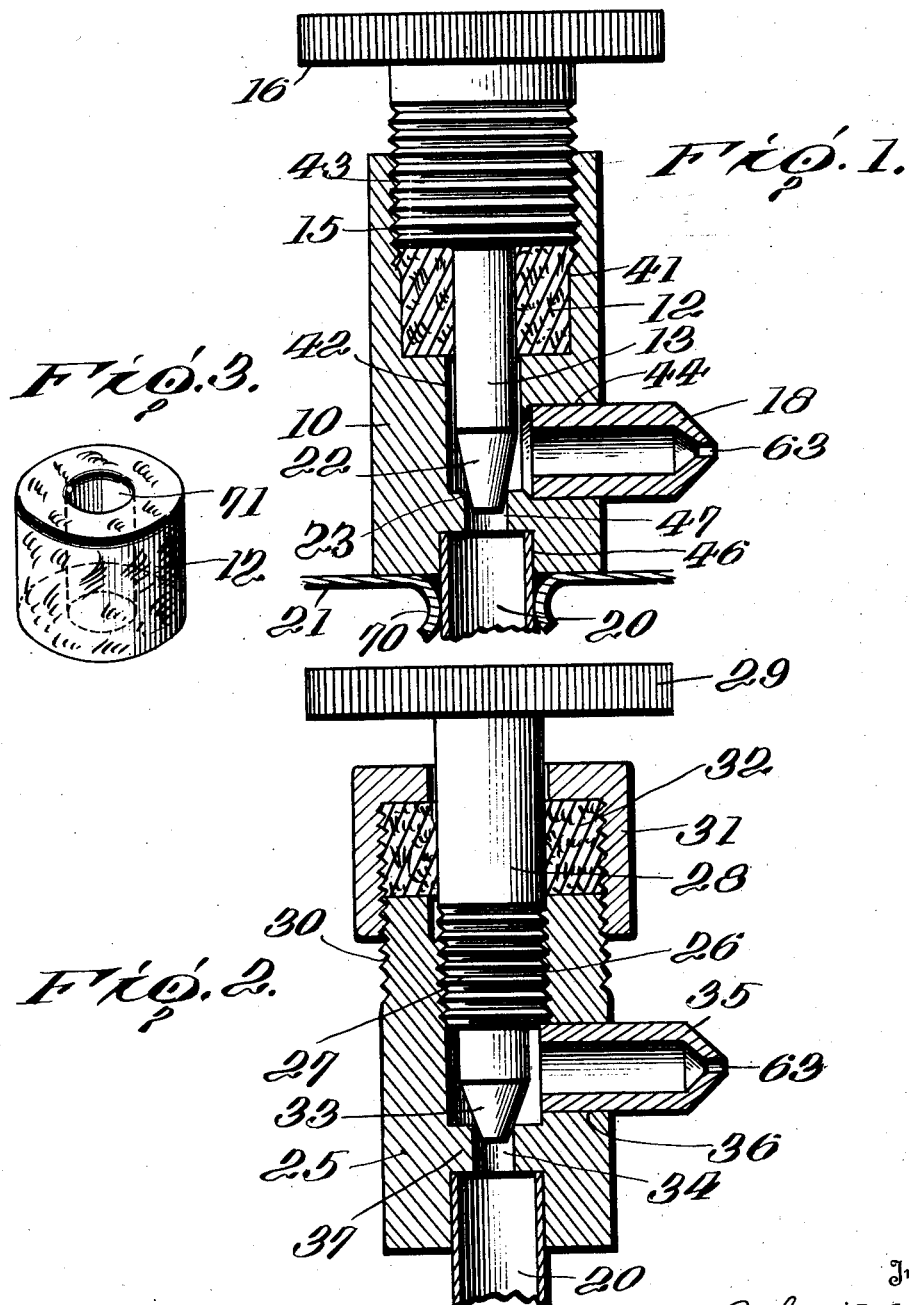

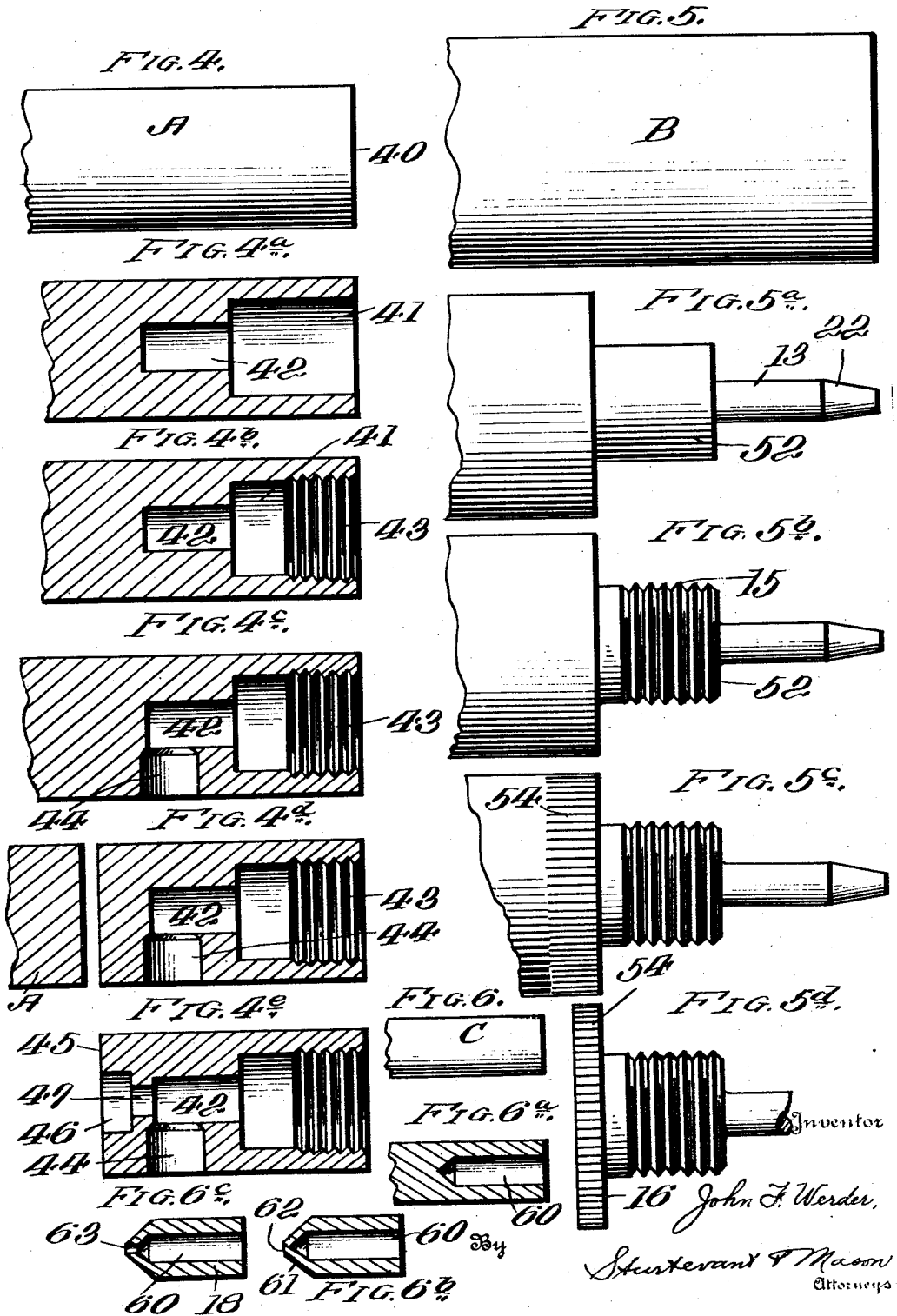

1,833,983

UNITED STATES PATENT OFFICE

JOHN F. WERDER, OF CLEVELAND, OHIO, ASSIGNOR OF ONE-HALF TO EDMUND ROGERS

VALVE

Application filed July 22, 1926. Serial No. 124,150.

This invention relates to improvements in valves, and more particularly to small and cheaply made pressure-retaining valves.

Valves of this kind have heretofore been proposed and made, which may be able to retain high pressures, but such have been expensive of manufacture, as they required castings and a number of separate machining operations and were difficult to assemble upon their containers.

As distinguished from such prior devices, the valve made according to the present invention is constructed substantially by operation in a single machine, preferably a turret or screw machine; and the elements are cut from a bar which can be automatically chucked and fed in presently known machines of such type, thus eliminating the use of castings and hand chucking. This valve may then be assembled by forced fits and soldering to the container which is to be sealed thereby: such as the dispensing vessel shown and described in my prior Patent No. 1,762,903, dated June 10, 1930, to which reference is made for further details of the assembly and operation.

In the drawings:

Figure 1 shows a section through a valve made and assembled according to this invention.

Fig. 2 is a similar section through a modified form of the valve.

Fig. 3 is a perspective view of a packing bushing.

Figs. 4, 4a, 4b, 4c, 4d and 4e illustrate the successive stages of forming a valve body.

Figs. 5, 5a, 5b, 5c and 5d illustrate the successive stages of forming the closure element.

Figs. 6, 6a, 6b and 6c illustrate the successive stages of forming the nozzle.

In Fig. 1 is shown an assembled valve of the type in question. The valve body 10 is formed as set forth, preferably of brass. The chamber 41 formed in its upper end receives a packing bushing 12 which surrounds the stem 13 of the valve closing element. This valve closing element has a screw thread 43 which engages in the internal threads 15 provided on the inner wall of the chamber 41; and a head 16 is provided with a knurled or milled edge to facilitate easy rotation by the fingers. When the closure element is threaded in the body 10, the shoulder formed at the lower end of the threads 43 comes against the upper surface of the bushing 12 and the latter is compressed against the bottom of the chamber 41, whereby it is caused to change area radially and form a tight seal between the wall of the chamber 41 and the stem 13 of the closure element.

The central aperture 71 and the periphery of the bushing are preferably of such dimensions that they form a tight fit upon the stem 13 and in chamber 41 even without compression, so that leakage does not occur even without the axial compression.

The lateral aperture 44 of the valve body 10 receives the discharge nozzle 18.

The bottom of the valve body 10 has a cavity 46 to receive the pipe 20 which extends downward into the body of a can represented by the fragment 21. This pipe 20 and can arrangement is clearly set forth and claimed in my said prior Patent No 1,762,903, to which reference is made for further details of the assembly and operation.

The pipe 20 is in communication with the nozzle 18 through the passage 47 and the chamber 42. The shoulder 23 at the upper end of the passage 47, at its junction with chamber 42 has preferably a right angle, so that the conical nose 22 of the closure element tends to form a tight seal thereagainst.

In the modified form shown in Fig. 2, the valve body 25 has a cavity 26 at its upper end to receive the screw-threaded portion 27 of the valve closure element which has a stem 28 terminating at its top in a knurled or milled head 29 similar to the head 16 above described.

A screw-threaded portion 30 is likewise provided on the outside of the valve body 25 to receive the packing nut 31 which loosely surrounds the stem 28, and holds the packing bushing 32 in relation with the stem. When the nut 31 is drawn tight, the bushing 32 is compressed between the inner surface of the wall of the nut 31 and against the upper wall of the valve body 25, whereby the material is caused to spread laterally and form a tight sealing joint between the stem 28 and the nut 31.

The lower end of the valve closure element has a conical head 33 which is adapted to fit in the small passage 34 and against the sharp edge of its wall rim to seal the same against the delivery of liquid.

The discharge nozzle 35 is positioned in a lateral recess 36 of the valve body in the same manner as that described above.

In Fig. 3 is shown the type of packing bushing employed to establish a tight seal in the valve. This bushing is preferably made of agglomerated cork fragments, and has a cylindrical shape with end surfaces at right angles thereto and a central aperture 71 which is of sufficient size to receive the stem 13 or 28 of the valve closing member.

The assembled valve provides a very small passage and chamber outside of the closure between the conical element 22 or 33 and its seat 23 or 37 respectively, so that when the valve is opened only a very small quantity of liquid is required to entirely fill this chamber, so that there is no large wastage in the device after the valve is closed. The conical shape of the valve 22 or 33 enables it to seat itself perfectly, even though slight mechanical inaccuracies occur in the making of the several parts, and as it is screwed down, the sharp edge 23 of the semi-soft brass valve seat may be somewhat deformed, thus ensuring that the valve will make a tight fit.

The method of forming the valve body on an automatic screw machine is shown in Figs. 4, 4a, 4b, 4c, 4d and 4e. In Fig. 4 the bar A of brass or other suitable material is shown with the flat end 40 as cut during a previous operation of the screw machine. It is customary to provide automatic screw machines with five tool holders on a turret so that five operations may be accomplished in succession. If it is necessary to employ six operations, it is required that a specially designed screw machine be employed or that the article be removed from the screw machine for the further operation. According to the present invention, substantially all of the work is done upon the screw machine before the articles are parted from the bar from which they are made.

In Fig. 4a is shown the effect of the first operation, which consists in drilling the end of the bar with a double bore to form the chamber 41 and the bottom recess 42 in the same.

In Fig. 4b is shown the effect of the second operation which is that of providing the chamber 41 with an internal screw thread 43.

In Fig. 4c is shown the effect of the third operation which is performed while the blank A is at a standstill and consists in a transverse drilling of the bar by a cross-feed tool on the screw machine to produce the lateral opening 44 which communicates with the recess 42.

In Fig. 4d is shown the effect of the fourth operation which comprises cutting off the article thus far finished from the remainder of the bar A, so that the latter is now ready to be fed forward for an appropriate distance into the position shown in Fig. 4, for the manufacture of a further article.

Fig. 4e shows the final operation which is preferably accomplished on a sensitive drilling machine by a high speed drill which is operated from the rear surface 45 of the article and is employed to form the enlarged bore 46 and the reduced bore 47, the latter being in communication with the recess 42. This completes the valve body proper.

In Figs. 5, 5a, 5b, 5c, 5d are shown the machine operations for forming the valve closing element or screw stem. In Fig. 5 the blank B is preferably a bar of brass or other suitable material of an appropriate diameter.

The result of the first operation upon this bar is shown in Fig. 5a in which the extreme end of the bar has been reduced to a conical formation 22 joined by a stem of relatively small diameter 13 to a larger section 52.

The result of the second operation is shown in Fig. 5b in which the section 52 has received a screw threading 15.

In Fig. 5c is shown the third operation which consists in knurling the edge of the blank at 54.

In Fig. 5d the article has been cut off from the blank B to form the finger grip 16, and is now ready for employment. It will be noted that although the knurling 54 accomplished in the third operation may extend for a greater distance along the bar than the actual thickness of the head 16 of the finished article, yet this knurling is cut away during the next operation as shown in Fig. 5a.

In Figs. 6, 6a, 6b and 6c is shown the method of making the lateral discharge nozzle. The first operation consists of cutting a very slight portion of the end of the blank C as shown in dotted lines in Fig. 6.

The second operation consists in passing a drill into the end of the bar to form the recess 60 (Fig. 6a). The next operation (Fig. 6b) consists in cutting off the article to form a conical nose 61 having a flat 62 at the point. The article is in this condition removed from the screw machine and a very fine aperture or nozzle opening 63 (Fig. 6c) is drilled through the flat 62 of Fig. 6b for the passage of the small stream of liquid. It has been found in practice that owing to the small size of this hole it is necessary to use a sensitive drill in order to obtain the high speed necessary for clean cutting and to prevent breaking of the drills.

It will be observed that all parts of the valve are very rapidly and quickly made from bar stock on an automatic screw machine with resulting cheapness, so that it has been found in practice that the cost of a valve of this type is very small, and its employment upon a very large scale is economically feasible.

In assembling the device, the lateral nozzle member 18 is forced into the lateral aperture 44 of the valve body, whereby its slight taper enables the establishing of a tight and permanent joint. The closure member and bushing are screwed in, and the pipe 20 forced in.

The valve is then ready to be placed upon a can body. Preferably, as set forth in my aforesaid patent, a hole is pierced in the can so that inwardly projecting ragged edges 70 are formed to serve as a guide for the pipe 20. The pipe 20 is slipped into the hole, and scraps of solder and flux placed about it: the valve body is then forced down until it compresses the solder against the can wall, and heat is applied to melt the solder, which then forms a tight connection and seal between the valve body, the pipe, and the can, as shown in black in Fig. 1.

The modified form of valve is constructed and assembled in similar manner.

It is obvious that the invention is not limited to the specific forms described and illustrated, but that it may be modified further within the scope of the appended claims.

I claim:

1. In a valve, an externally cylindrical body having a cavity at one end with threads formed on the wall thereof, and a cavity at the other end, with a communicating passage between said cavities having a reduced aperture adjacent said second cavity, all of said cavities, passage and aperture being concentric with the axis of said body, a valve head member having a conical portion to be received only part way in said aperture and to form a sealing relation with the edge thereof next adjacent the threaded portion, and a threaded portion to engage the thread in said first cavity, said valve head member having a shoulder adjacent the end of said thread, a packing bushing located about said valve head member and against said shoulder and adapted to be received within the said first cavity and to be compressed therein during the closing movement of said valve head with regard to the edge of the aperture whereby to establish a seal between said valve head and said valve body, said valve body having a lateral passage opening from said first passage, and a nozzle member received by a forced fit in said lateral passage.

2. A valve comprising a block having a circular port and an enlarged chamber adjacent said port, the walls of said chamber and port at the point of juncture being substantially at right angles to each other, whereby the mouth of said port is provided with a sharp edge, and a valve member located in said chamber and having a screw threaded engagement with said block, said valve member being of a diameter greater than that of said port, and having a conical or tapered end adapted to partially enter the mouth of said port to close the same, the walls of said port and the conical end of said valve member being formed of semi-soft metal, whereby, when the valve member is rotated and forced into the mouth of the port by means of the screw threads, the metal of the parts is somewhat deformed, and a tight seal ensured.

3. Means for controlling the flow of fluid comprising a member having a cylindrical port formed at its end with a sharp peripheral edge, a closure member of larger diameter than said port having a tapered end portion rigid therewith and disposed co-axially with and adapted to partially enter said port, the walls of said port being formed of semi-soft metal, and screw means for simultaneously rotating said closure member and forcing the sides of the tapered end portion thereof into engagement with said sharp peripheral edge of said port, whereby said edge is somewhat deformed and said port tightly sealed.

4. A valve comprising a valve body having a circular port and an enlarged chamber adjacent said port, the walls of said chamber and port at the point of juncture being at such an angle to each other as to provide a sharp edge, constituting a valve seat, and a valve member located in said chamber and having a conical or tapered end adapted to partially enter the mouth of said port to close the same at the contact line of said valve member and valve seat, and screw thread means for forcing said valve member into the mouth of said port, the walls of said port being formed of semi soft metal, whereby, when the valve member is forced by said screw thread action into the mouth of the port, the metal of the sharp edge is deformed into a cooperative fit with the closure member and a fluid tight seal insured.

5. A valve comprising a valve body having a circular port and enlarged chamber adjacent said port, the walls of said chamber and port at the point of juncture being at such an angle to each other as to provide a sharp edge, constituting a valve seat, and a valve member located in said chamber and having a conical or tapered end adapted to partially enter the mouth of said port to close the same at the contact line of said valve member and valve seat, and screw thread means for forcing said valve member into the mouth of said port, the walls of said port and the conical end of said valve member being formed of semi soft metal, whereby, when the valve member is forced by said screw thread action into the mouth of the port, the metal of the parts is deformed into a cooperative fit one with the other and a fluid tight seal insured.

In testimony whereof, I affix my signature.

JOHN F. WERDER.